United States Patent [19]

Dischert

[11] Patent Number: 4,471,388
[45] Date of Patent: Sep. 11, 1984

[54] TELEVISION CAMERA MECHANICAL APPARATUS DRIVEN BY RECORDER MOTOR

[75] Inventor: Robert A. Dischert, Burlington, N.J.

[73] Assignee: RCA Corporation, New York, N.Y.

[21] Appl. No.: 330,033

[22] Filed: Dec. 14, 1981

[51] Int. Cl.³ .......................................... H04N 5/782
[52] U.S. Cl. .................................... 358/320; 360/79; 358/906
[58] Field of Search ............... 358/310, 320, 335, 337, 358/148, 53, 41, 209, 210, 225, 42, 43, 906; 360/79, 33.1

[56] References Cited

U.S. PATENT DOCUMENTS

| | | |
|---|---|---|
| 2,712,035 | 2/1951 | Jackson . |
| 2,914,608 | 11/1959 | Blackstone .......................... 358/148 |
| 3,600,504 | 8/1971 | Reilly .................................... 358/42 |
| 3,603,722 | 9/1971 | Graham . |
| 3,689,690 | 9/1972 | Tan . |
| 3,833,758 | 9/1974 | Ferrari . |
| 3,969,763 | 7/1976 | Tan . |
| 4,125,857 | 11/1978 | Sarson et al. . |
| 4,200,934 | 4/1980 | Hoffman . |

FOREIGN PATENT DOCUMENTS 2802670  7/1979  Fed. Rep. of Germany .

OTHER PUBLICATIONS

"Charge Transfer Devices", Supplement 8 to the series, Advances in Electronics and Electron Physics, by Sequin and Tompsett, pp. 178–183.
Ampex Brochure, "The BC-210 Studio Color Camera".
Knorr–Grundig Tech. Inf., (German), #3,1977.

Primary Examiner—Donald E. McElheny, Jr.
Attorney, Agent, or Firm—E. M. Whitacre; W. H. Meise; L. C. Edelman

[57] ABSTRACT

A television camera-recorder combination includes an imager which forms a signal representative of the image during an integration interval. The integration interval is followed by a pull-down interval during which the integrated signal is transferred out of the photoresponsive region. Streaking of an image displayed from the signal results from light falling on the photoresponsive region during the pull-down interval. A mechanical shutter periodically prevents light from falling upon the photoresponsive region of the imager. The shutter is synchronized with the pull-down interval. The synchronization and drive arrangement of the video recorder portion is mechanically coupled to the shutter to provide a common drive. In another embodiment, a color wheel associated with the viewfinder of the camera is mechanically coupled to the video recorder drive arrangement for common mechanical drive.

15 Claims, 7 Drawing Figures

TELEVISION CAMERA MECHANICAL APPARATUS DRIVEN BY RECORDER MOTOR

This invention relates to television camera-recorder combinations in which a camera shutter and or other synchronized mechanical apparatus associated with the camera portion of the combination is mechanically driven in conjunction with the mechanical parts of a television recorder.

It is expected that future television cameras will include one or more solid-state imagers for forming television signals from the image to be televised. Solid-state imagers are small and light in weight compared with the electron-beam tubes presently in common use, are relatively insensitive to mechanical shock, and are capable of providing improved performance, as for example reduced lag at low light levels.

The solid-state imagers now used are principally charge-coupled devices of two main types. The first type known as an area imager, includes photosensitive material in which free electrons are generated under the influence of light. Into this surface are diffused vertical "channel stops", which are elongated diffusions oriented vertically so as to form the photosensitive material into many vertical channels. The number of vertical channels thus formed determines the horizontal resolution of the imager. For example, an imager might have 300 or 400 vertical channels, and therefore would have an equal number of resolution elements in a vertical direction. Vertically arrayed in association with each channel are transparent metalizations; to which voltages are applied to form "wells" in the photosensitive material in which electrons freed from the crystal structure by the presence of light are held and prevented from moving vertically along the particular channel. The number of wells in each vertical channel determines the vertical resolution of the imager. If the number of wells is about 250, the vertical resolution of the imager established by the number of horizontal lines would correspond with a common television standard. In operation, an "A" portion of the photosensitive surface is exposed to light for a fixed period of time known as an integrating interval", and electrons collect in the wells in a number representative of the time integral of the light falling on the surface near the well. At the end of the integration interval, which ordinarily corresponds to the active part of a television frame interval, the voltages applied to the well-determining metalizations are varied at a clock rate to cause the wells to effectively move, carrying their associated free electrons into another part of the structure known as a "B" register, which is shielded from light. This transfer occurs during a "pull-down" interval, which is short relative to the integration time. When the signal has been transferred from the A to the B register, the photosensitive material is again free to integrate signal representative of light. When the signal is in the B register, it is free from the influence of light.

The area imager type of imager is subject to vertical streaking which results because the photosensitive surface continues to produce free electrons during the "pull-down" interval as signal from other portions is transferred by the moving wells through the brightly lit portion of the channel. These additional free electrons add to those in each moving well and are transferred with them into the B register. Thus, all wells passing through the brightly lit portion of the channel acquire additional free electrons, over the quantity which they would have had in the absence of the bright light. These additional free electrons are indistinguishable from those which formed in the well during the integration interval, and therefore cannot be removed or compensated for, with the result that the signal transferred past a bright spot appears brighter than it should be. This results in an apparent vertical streak in regions having bright spots.

The second type of imager uses the same basic photosensitive surface and channel stops, but defines the vertical resolution differently. In this second type, the vertical resolution is established by a succession of elongated horizontal opaque regions. A vertical resolution element is defined by the space between opaque strips. In this type of imager, the signal in each well is transferred downward from the exposed region to the next adjacent opaque or unexposed region. The signal is then transferred horizontally out of the active portion of the imager along further diffused paths lying under the opaque portions. While such imagers are not subject to streaking, their sensitivity to light is relatively low because a substantial portion of the surface is not devoted to production of electrons from light, but rather is covered by the opaque horizontal strips, or used for the horizontal transfer of signals under the strips. The difference in sensitivity is marked, and it may be desired for many purposes such as electronic journalism (EJ) or electronic newsgathering (ENG), or for security monitoring to use the more sensitive area imagers.

When it is desired to eliminate the streaking caused by bright spots in the area imager, a mechanical shutter can be used to shut off light from the image during the pull-down interval. The mechanical shutter, however, has the disadvantage of requiring a mechanical drive, which in turn requires some form of motor, whether of the rotary type or a linear-acting solenoidal type. A shutter motor requires energy to overcome motor losses as well as requiring energy which is delivered to the shutter. It is desirable to reduce this loss. Also, such a motor-driven shutter must be synchronized with the operation of the imager, so that the shuttering occurs during the pull-down interval, otherwise it will shut off light during the integrating interval and thereby reduce sensitivity. The synchronization requires synchronization circuits and may require structure coupled to the shutter to indicate position, and requires power to drive the synchronization circuits. The motor speed may require changing, in order to achieve synchronization, in which case the motor may operate on a less efficient part of the load curve than would a single-speed motor. It is desirable to reduce these disadvantages of a shutter or of any synchronized mechanical device associated with the camera.

SUMMARY OF THE INVENTION

A television camera-recorder combination for recording television signals representative of a scene includes a television camera adapted for generating television signals representative of a scene. The camera includes a mechanical apparatus adapted for being driven in synchronism with the signals. A controllable recorder is coupled to the camera for receiving the signal and for recording the signals at a rate controlled by a mechanically driven device. A synchronizer controls the rate of the mechanical device in the recorder to be in sync with the signals. A mechanical coupling links the camera mechanical apparatus and the recorder mechanical device for common drive, whereby synchronization is maintained by a single synchronizer.

DETAILED DESCRIPTION OF THE INVENTION

Figure 1:
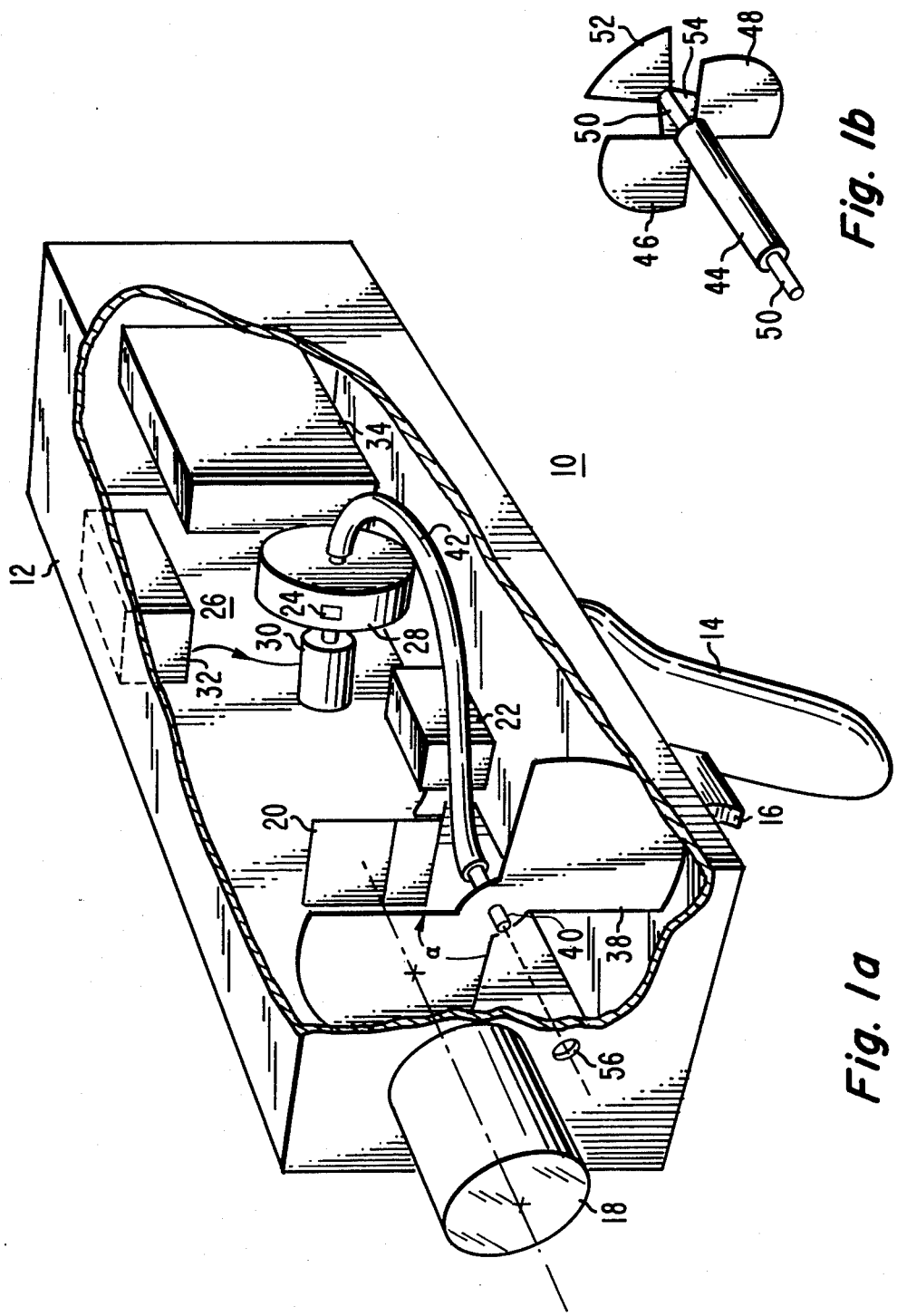
FIG. 1, consisting of 1a and 1b, illustrates generally in perspective view a camera-recorder combination in accordance with the invention.

In FIG. 1, camera-recorder-combination 10 useful for portable ENG applications includes a case or housing 12 and a handle 14. A trigger 16 energizes the operation of the camera and recorder from batteries (not shown) in order to record a scene. A lens or optical processor 18 focuses light from the scene (not shown) onto the photosensitive portion of a solid state imager 20 which as illustrated in FIG. 1 is a monochrome imager. The imager is electrically coupled to an imager drive circuit 22, which controls the imager to produce signal, and which couples the signal so produced to the transducers such as 24 mounted on the headwheel 28 of a helical-scan recorder designated generally as 26 mounted within housing 12. A motor 30 is mechanically coupled to the headwheel and is driven by electrical signals from a motor synchronization and drive circuit illustrated as a block 32. A tape cartridge 34 inserted into housing 12 carries a reel of tape (not shown). The tape (also not shown) is either wrapped about headwheel 28 or simply pressed against a substantial portion of the periphery of the headwheel so that the rotating transducers scan across the tape. As the headwheel and transducers rotate, the transducers transduce the signals received from imager drive circuit 22 to the tape. The tape is slowly moved across the headwheel by a mechanical drive such as a capstan (not shown) under the control of further synchronizing circuits. The ultimate source of mechanical energy for the capstan may be motor 30.

A shutter 38 in the form of notched wheel forming two blades is mounted on an axle 40 for rotation so that the blades alternately pass between lens 18 and imager 20 as the shutter rotates. The blades are opaque, so that the blades shut off light to, or shutter, the imager when interposed in the light path. Axle 40 is affixed to the center of the shutter, and is mounted on bearings (not shown) allowing easy rotation. A mechanical coupling in the form of a flexible shaft 42 links the axle of headwheel 28 and the axle 40 of the shutter. In the particular embodiment shown, flexible shaft 42 is a length of resilient rubber tubing pressed over the axles of the shutter and the headwheel. This mechanical link slaves the rotation of the shutter to the rotation of the headwheel.

In a helical-scan recorder, the headwheel often rotates once for each two transducer scans across the tape, and each scan represents a field. Thus, one rotation of the headwheel occurs in the time of one television frame. Ordinarily, the imager integrates for a time substantially equal to one field, so there are two integration periods and two pull-down intervals during each frame interval. Consequently, two pull-down intervals occur in the same time as one rotation of the headwheel. In order to shutter the imager during each pull-down interval, the shutter has two blades disposed 180 degrees apart. Each blade shutters the imager once during each half-rotation of the headwheel or once during each field interval. The approximate angular sector $\alpha$ subtended by each of the two blades is proportioned to 180 degrees in the same ratio as the pull-down time $t_{pd}$ to the field interval $t_f$, according to the equation $$\alpha° = t_{pd}/t_f(180°)$$

When other rotational relationships occur, the number of blades on the shutter can be changed.

The initial synchronization of the headwheel position with the shutter position is established by the initial positions when the linking tube is connected. In the particular embodiment shown, the elasticity of the tubing causes a grip on the axles sufficient to prevent slippage. Naturally, a clamp may be used as required.

In order to provide improved resolution of moving images, the width of the shutter blades may be made adjustable. Thus, each of the shutter blades can be formed from two coaxial sections. In the exploded view of FIG. 1b, an outer shaft 44 bears shutter blade portions 46 and 48. An inner shaft 50 bears additional blades 52 and 54. Shafts 44 and 50 are long enough to protrude through opening 56 in housing 12, so they are accessible to allow relative rotation therebetween. Drive tube 42 is coupled to an extension of shaft 50, not visible in FIG. 1b. The two portions are maintained in the selected positions by a locking spring washer (not shown) between the elements. With this arrangement, the light passage between the blades of the shutter can be reduced to a slit, which reduces the sensitivity of the camera, but aids in "freezing" image motion.

Figure 2:
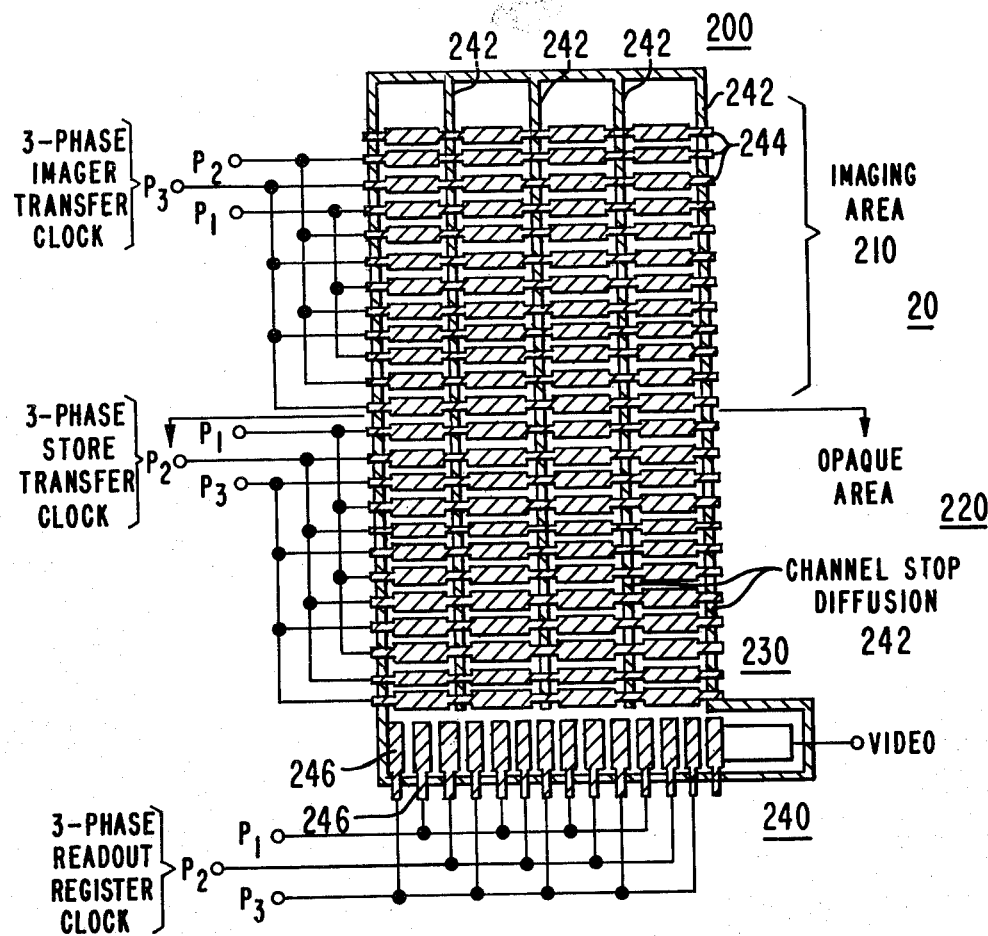
FIG. 2 illustrates an imager which may be used in the arrangement of FIG. 2.

FIG. 2 illustrates details of imager 20. Imager 20 includes an A imaging area 210 which is responsive to light and which is available for integration. A second area designated generally as 220 is also photosensitive but is covered with an opaque light shield. Region 220 includes a B storage area 230 and a C readout register 240. The photosensitive area within both regions 210 and 230 is divided by channel stop diffusions 242 into vertical channels within which charge can move. Each channel is divided into a plurality of vertical segments by transparent conductive portions 244 to which voltages are applied in a three-phase manner for generating potential wells and for moving the wells in known fashion, as described in the text "Charge Transfer Devices", supplement 8 to the series "Advances in Electronics and Electron Physics" by Sequin and Thompson, published in 1975 by Academic Press. The potential wells are stationary during the integration interval. The clocks are operated during each pull-down interval between integration intervals so as to move the potential wells and the integrated electrons therein into the B storage portion 230 of the imager. During the next following integration interval, the wells in the storage region 230 are shifted downward into C readout register 240 from whence they are clocked at a high rate by another three-phase clock to produce output video.

As described, a bright spot within A imaging area 210 continues to produce free electrons within the affected channel or channels, and as the potential wells are moved downward during the transfer interval, the electrons thus generated increase the charge in each well as it passes by the bright spot. This additional charge being indistinguishable from the charge in the well attributable to the integration period, makes it appear that each well which has moved past the bright spot has received more light during the integration interval, and the signal correspondingly indicates a greater luminance. This undesirably results in streaking.

When the shutter is interposed between the source of light and imaging area 210 during the pull-down interval, no further generation of free electrons takes place within the imaging area, and the potential wells which move through the channels defined by channel stops 242 are substantially unaffected by extraneous light. Consequently, streaking cannot occur.

Figure 3:
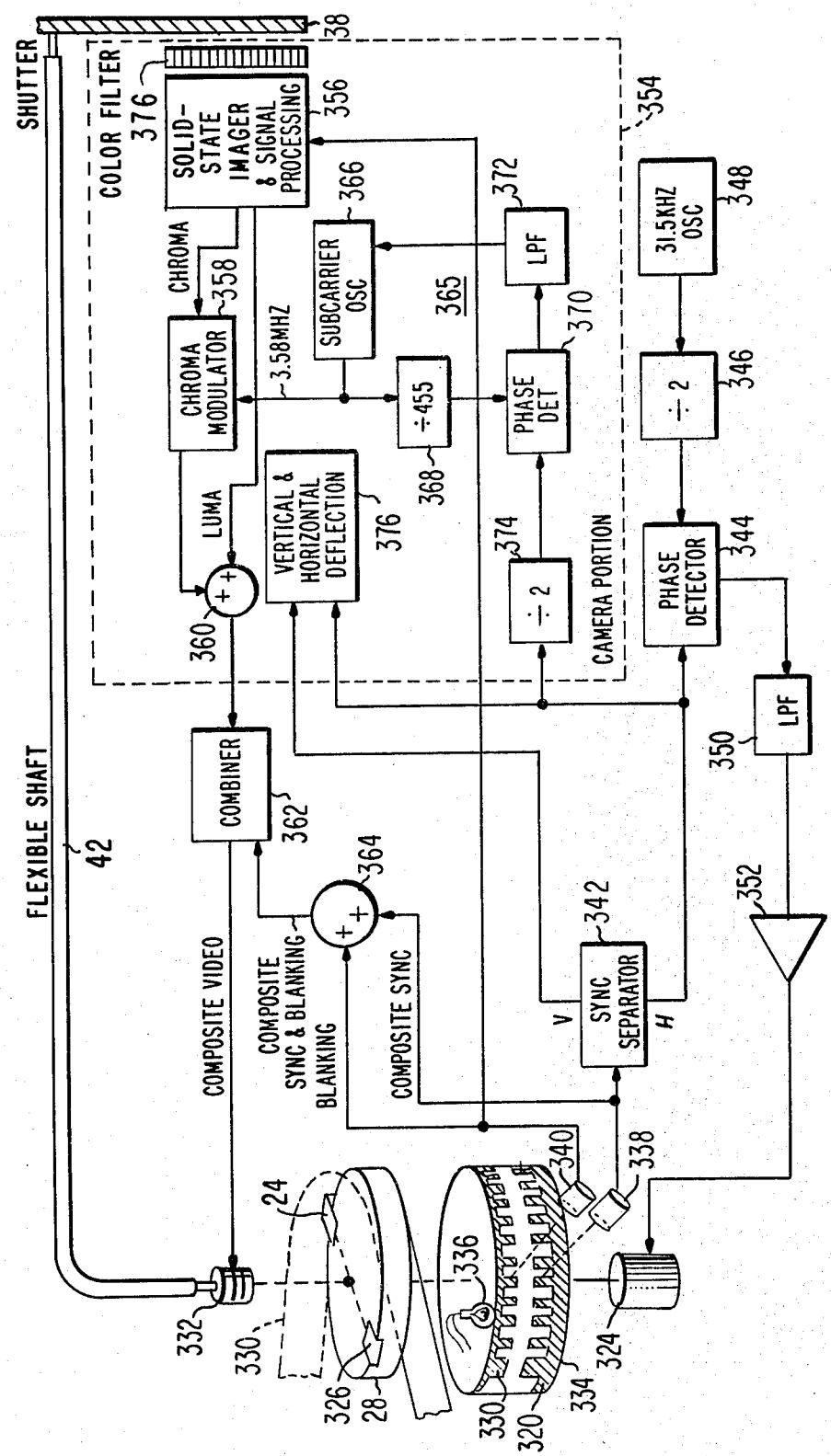
FIG. 3 is a diagram in block and pictorial form of the synchronizing and drive portions of the arrangement of FIG. 3.

FIG. 3 illustrates in semi-pictorial and block-diagram form synchronizing arrangements for a color video tape recorder-camera combination adapted for portable use, similar to that described in U.S. patent application Ser. No. 216,170 filed 12-15-80 in the name of R. A. Dischert. In FIG. 3, a camera portion designated generally as 354 is associated with a recorder including a headwheel 28 bearing transducers 24 and 326 which are adapted for scanning across a tape 330. Headwheel 28 is drive by a motor 324, which also drives a transparent toothed wheel 334 upon which is a printed representation of television synchronizing signals. A light bulb within wheel 334 shines through the print and energizes photocells 338 for generating composite sync signals which are applied to a sync separator 342 for separation into horizontal and vertical sync components. The horizontal sync components are applied to a phase detector 344 for comparison with horizontal-rate signals produced by an oscillator 348 and divider 346. The output signal from phase detector 344 is coupled by means of a low-pass loop filter 350 and an amplifier 352 to motor 324 to control the average rate of the horizontal sync signals generated by toothed wheel 334 to equal the reference horizontal frequency. The horizontal and vertical sync signals are also applied to camera 354 for essentially instantaneous control of the scanning rate of the imager and signal processing portion 356, which comprises an imager such as imager 20. In the arrangement of FIG. 3 a single solid-state imager is used in conjunction with a color encoding filter 376 for generating luminance and chrominance signals from the image. In accordance with the invention, shutter 38 is arranged for rotation in front of imager and signal processor 356 and is driven by a flexible shaft 42 from an axle associated with headwheel 28.

It can easily be understood that the arrangement illustrated in FIG. 3 is superior to an arrangement in which shutter 38 is driven by a separate motor. For example, the losses in motor 324 are likely to be less than the losses in two motors, one driving the headwheel and the other driving the shutter. Furthermore, those portions of the synchronizing circuits adapted for synchronizing the motor with a reference signal need not be duplicated, with a corresponding saving of size and weight, which are very important in portable applications, and the reduced component count enhances reliability and further reduces power consumption.

Figure 4:
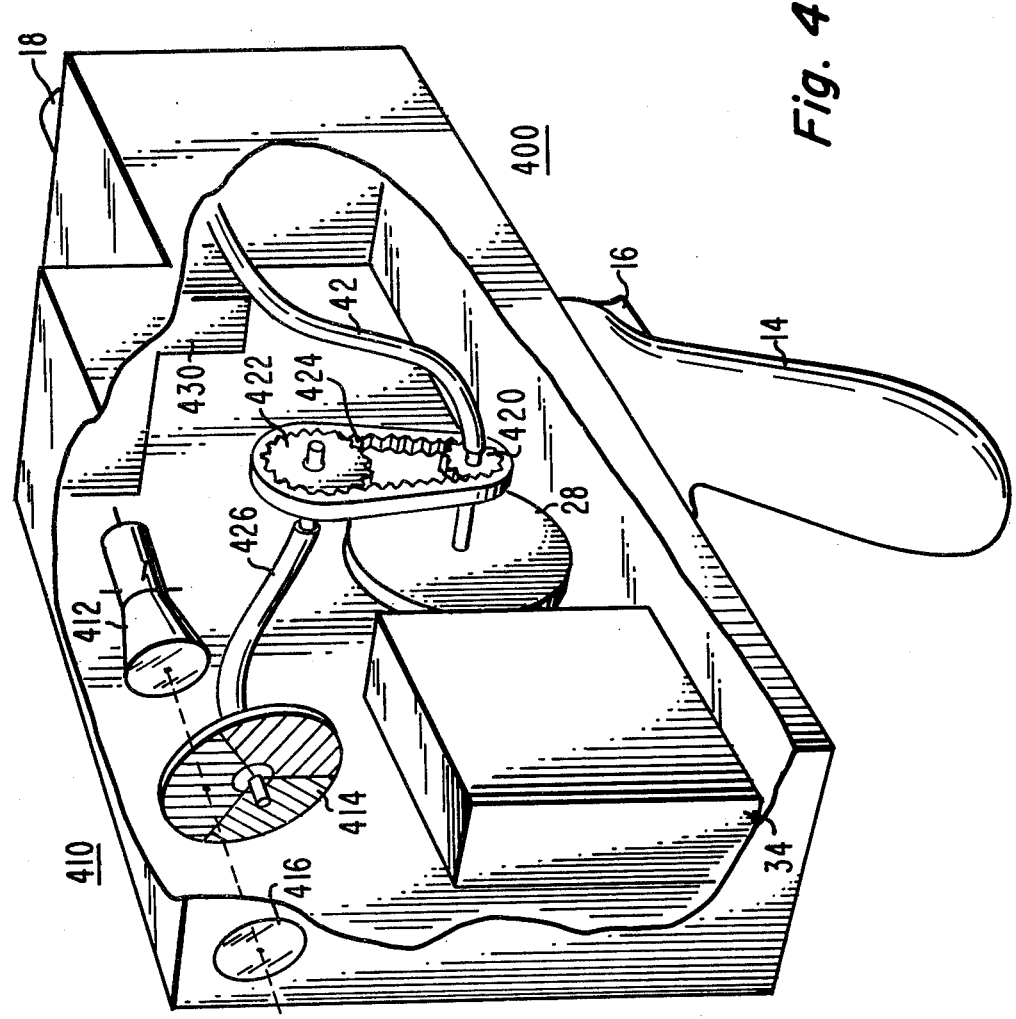
FIG. 4 illustrates in perspective view a television color camera-recorder combination using a mechanical colorwheel according to an aspect of the invention.

FIG. 4 is a perspective view of a simplified color television camera-recorder combination 400 having another type of mechanical apparatus associated with the camera portion of the combination. In FIG. 4, the camera portion of the combination has a color viewfinder 410 using a black-and-white kinescope 412 which sequentially displays fields of video received from the camera. A color wheel 414 is coupled between kinescope 412 and a viewfinder lens illustrated as 416. The viewfinder display is thus a field-sequential color display in which the eye views a black-and-white image of one of the colors through a corresponding colored portion of the color wheel.

In FIG. 4, headwheel 28 is driven by a motor (not shown) synchronized with the color imager (also not shown), in a conventional manner or as described in conjunction with FIG. 3. As mentioned, headwheel 28 makes one complete revolution for each two fields. Color wheel 414 has three color regions, which may be red (R), green (G), and blue (B), and each region subtends 120°. Since each colored portion of color wheel 414 is associated with one field in a field-sequential color system, wheel 414 must make one revolution in the time of 3 fields. Thus, color wheel 414 must make $\frac{2}{3}$ revolution in the same time required for headwheel 28 to make one revolution. A gearing ratio of 1.5 is required in the mechanical drive between headwheel 28 and color wheel 414. This is provided by toothed gear 420 coupled to the shaft of headwheel 28 and a toothed gear 422. All rotating elements rotate on bearings (not shown). A toothed drive belt 424 links gears 420 and 422. The number of teeth on gear 422 is in the ratio of 3/2 to the teeth on gear 420. Each rotation of headwheel 28 and gear 420 causes $\frac{2}{3}$ rotation of gear 422. The shaft of gear 422 is coupled by means of a second drive shaft 426 to the axle of color wheel 414. As illustrated in FIG. 4, the axles of color wheel 414 and gear 422 are not coaxial, so a flexible tube is used for drive shaft 426.

The physical arrangement of FIG. 4 drives color wheel 414 at the rate required for a field-sequential color viewfinder display, by the use of the mechanical drive and synchronization arrangements associated with the headwheel of the recorder portion of the combination. In order to provide a proper color display, the video signals applied to kinescope 414 must alternately represent the R, G and B portions of the image on a recurrent field-sequential basis.

The camera portion of combination 400 includes a color imager 430 upon which light is focussed by lens 18. Imager 430 may be of any standard type adapted for producing R, G and B component signals representative of corresponding colored portions of the image. Imager 430 may include, for example, a monochrome imager associated with a color-encoding filter of known type, or it may include a color-splitting prism for producing at three light output ports of the prism light of one of the three colors, together with three monochrome imagers, each coupled to one of the light output ports. In this latter arrangement, each of the three monochrome imagers receives light of one of the three colors R, G or B, and produces a signal representative of the corresponding colored portions of the imager.

FIG. 5 illustrates an arrangement for routing the proper signals to kinescope 414 in synchronism with the rotation of color wheel 414.

Figures 5A, 5B:
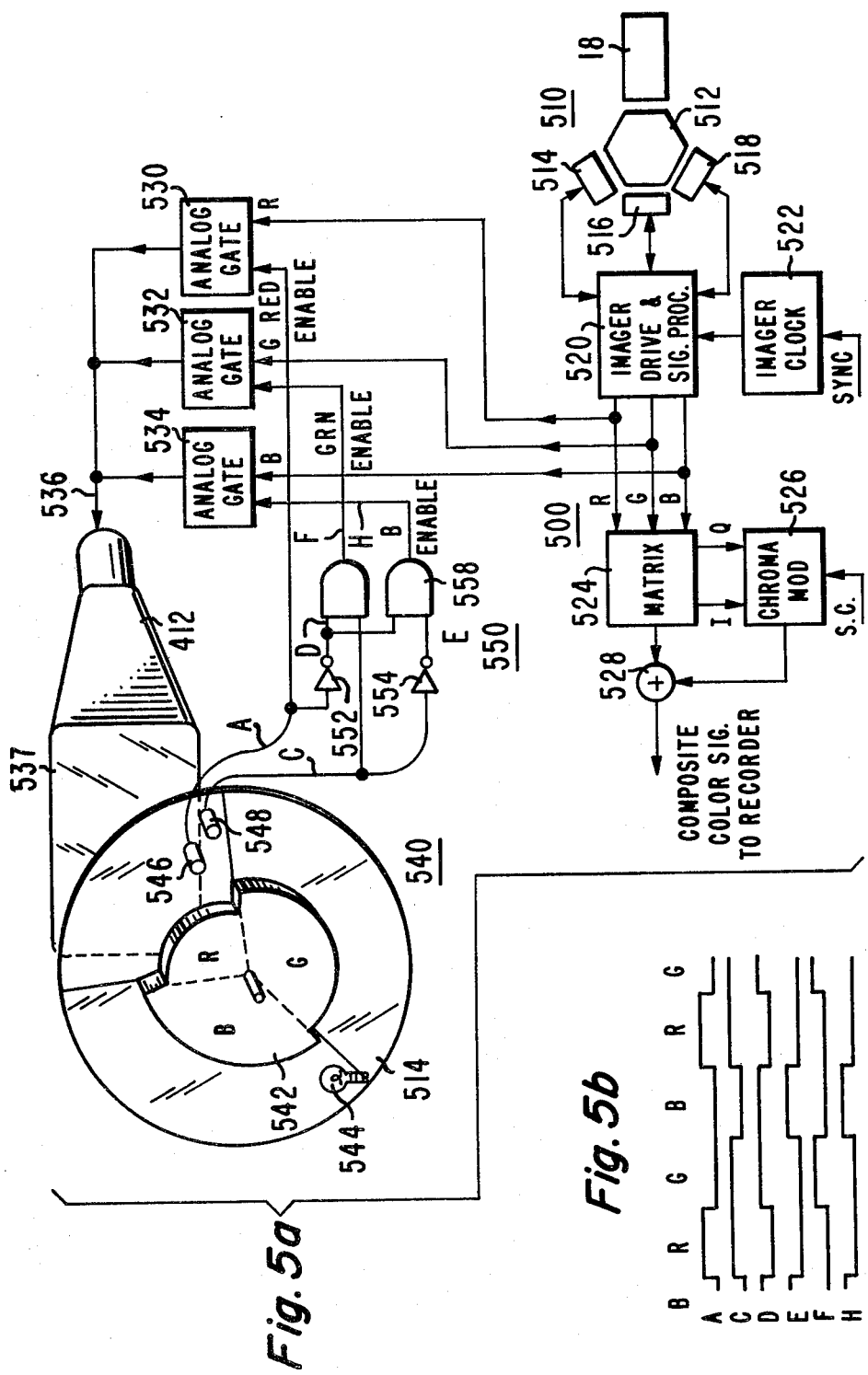
FIG. 5, consisting of 5a and 5b, is a semipictorial and block diagram of circuits used in the arrangement of FIG. 4.

FIG. 5a is a semipictorial block diagram illustrating an arrangement for positively synchronizing the video applied to the viewfinder kinescope 412. In FIG. 5, a lens assembly 18 focusses an image (not shown) onto an imager designated generally as 510, which includes a color-splitting prism 512 and individual R, G and B imagers 514, 516 and 518. Imager drive and signal processing circuitry illustrated as a block 520 is coupled to each imager for providing appropriate drive clock signals and for processing the imager signals to generate standard component R, G and B signals. Synchronization of the signal generation with an external source or with an associated recorder (not shown) is accomplished by an imager clock 522 coupled to processor 520 and receiving sync signals from the remote source. The red, blue and green component signals produced by processor 520 are coupled over R, G and B lines or conductors either directly to the associated recorder for recording on separate tracks, or as illustrated, to a matrix 524 in which Y, I and Q signals are generated from the R, G and B signals. The chrominance I and Q signals are coupled to a chroma modulator 526 for modulating the chrominance signals onto a subcarrier received by the modulator from a source (not shown). The modulated chrominance signals produced by modulator 526 are coupled to an adder 528 where they are added to the luminance signals from matrix 524 to form a composite color signal which is sent to the associated recorder for recording. Thus, the signals which are recorded or made available for external use are composite signals in which each of the three colors is available during each horizontal line of each field.

In order to provide a field-sequential color signal to kinescope 412 of the viewfinder, the R, G and B signals are passed through R, G and B analog gates 530, 532 and 534, respectively, to a control electrode terminal 536 of kinescope 412. The analog gates are enabled sequentially in an order related to the position of color wheel 514. The sequential control is accomplished by a position sensing arrangement 540 associated with color wheel 514 in conjunction with a logic circuit 550.

Position sensing arrangement 540 senses the position of the color wheel by a light gate 542, which is an opaque sheet mechanically coupled to the color wheel, and having R, G and B portions corresponding to the colored transparent parts of the color wheel. Each of the three portions of light gate 542 has a different radius. A light source illustrated as an incandescent lamp 544 is mounted adjacent light gate 542. Two photosensors, 546 and 548, are mounted on the side of color wheel 514 and light gate 542, in positions such that light from source 544 reaches both sensors when the red portion of color wheel 514 is between the viewfinder lens (not shown) and the screen of kinescope 412, but the light to sensor 546 is blocked by the G and B portions of light gate 542 when the G and B portions of the color wheel are between the viewfinder lens and the kinescope screen. The position of sensor 548 is further selected as illustrated such that it receives light from source 544 through light gate 542 when the G portion of color wheel 514 is interposed between the viewfinder lens and the kinescope screen 537 but the light is blocked by the B portion of the light gate when the screen is viewed through the B portion of color wheel 514. Sensors 546 and 548 produce a HIGH logic level signal on signal conducts A and C, respectively, when illuminated. The signal logic levels produced by sensors 546 and 548 on conductors A and C, respectively, during the R, G and B intervals during which the R, G and B portions respectively of color wheel 514 are interposed between the lens of the viewfinder and screen 537, are shown as A and C in the diagram of FIG. 5b. As can be seen, during the R interval, a HIGH logic level appears on conductors A and C, and a LOW logic level appears on conductors A and C during the B interval. During the G interval, A is LOW and B is HIGH.

The signal on conductor A is applied directly to the control input terminal of R analog gate 530 to enable gate 530 during the R interval. Thus, during the R interval in which the red portion of color wheel 514 is interposed between the viewfinder lens and screen 537, gate 530 is enabled, allowing R signals from signal processor 520 to reach control electrode 536. Since wheel 514 and light gate 542 are mechanically driven at ⅔ of the headwheel rate as described in conjunction with FIG. 4, the R interval lasts for one field interval. Consequently, gate 530 remains open for one field interval to couple red-representative signals to kinescope 412 to be displayed through the red filter of wheel 514.

Analog gates 532 and 534 are enabled by logic circuit 550 which decodes the signals from photosensors 546 and 548 to produce gate enable signals. Logic circuit 550 includes inverters 552 and 554, the inputs of which are coupled to conductors A and C, respectively, and which invert the logic levels and couple them to conductors D and E, respectively. The logic levels on conductors D and E, respectively inverted from those on A and C, are illustrated in FIG. 5b for the R, G and B intervals. An AND gate 556 has inputs coupled to conductors D and C, and its output coupled by way of a conductor F to a control input terminal of analog gate 532. Gate 556 produces a HIGH logic signal on conductor F when its inputs C and D are HIGH, which as illustrated in FIG. 5b occurs during the G interval. Thus, analog gate 532 is enabled during the G interval to pass the green component signal from processors 520 to control electrode 536 for display on screen 537 through the green portion of color wheel 514. During this interval, gates 530 and 534 are disabled.

An AND gate 558 has its input terminals coupled to conductors D and E and its output terminal coupled by a conductor H to a control input terminal of analog gate 534. Gate 558 produces a HIGH B enable signal on conductor H when its inputs on D and E are HIGH, which as illustrated in FIG. 5b occurs during the B intervals. Thus, during B intervals, the B component signals from processor 520 are coupled by analog gate 534 to control electrode 536 for display on screen 537 which is viewed through the B portion of color wheel 514. During the B interval in which gate 534 is open to allow passage of B signals, the R and G gates are closed to prevent R and G signal passage.

Consequently, arrangement 500 records simultaneous color signals; i.e. color signals which occur during the same line, in either component or composite form, while the viewfinder display is field-sequential color. Consequently, the signal recorded for subsequent use is not subject to color breakup or moving images. The viewfinder, on the other hand, uses a relatively simple and inexpensive color wheel and associated logic for a color display rather than an expensive shadow-mask color kinescope.

Other embodiments of the invention will be apparent to those skilled in the art. In particular, the blades of the shutter may be formed as a fan for moving air axially relative thereto, for urging air through the combination for cooling purposes. The imager may be a color imager of the color-encoding type rather than of the monochrome type, or it may include a color-splitting prism together with a plurality of imagers. In the case of recorders of other than helical-scan type, the recorder mechanical drive may still be adapted for mechanical drive of the shutter by suitable arrangements; for example, the capstan drive of a longitudinal recorder could by suitable gearing drive the shutter. While a flexible shaft is shown as linking the shutter and headwheel, a nonflexible shaft could be used if the headwheel and shutter are coaxial or in conjunction with a gear box or belt-drive if they have axels lying along parallel lines. If the rotating shutter and the headwheel have parallel axes, the weight of the shutter can be made approximately equal to that of the headwheel and its direction of rotating opposite to that of the shutter so as to reduce the total gyroscopic effect of the rotating parts on the entire assembly during motion. If the recorder and camera portions are in separable parts of the housing, the drive motor can reside in either portion.

What is claimed is:

1. An improved television camerarecorder arrangement for recording television signals representative of a scene, the arrangement comprising:
   a television camera adapted for generating television signals representative of a scene, said camera comprising a mechanical apparatus adapted for being driven in synchronism with said signals;
   controllable recorder means coupled to said television camera for receiving said signals therefrom for recording signals at a controlled rate by means of a mechanically driven device;
   synchronization drive means coupled to said recorder for driving said device in synchronism with said television signals; wherein the improvement comprises:
   mechanical coupling means coupled to said mechanically driven device and to said mechanical apparatus for causing said mechanically driven device and said mechanical apparatus to be driven in synchronism, whereby said mechanical apparatus and said mechanically driven device are maintained in synchronism with said television signals by a single synchronization drive means;
   wherein said camera comprises a kinescope viewfinder and said mechanical apparatus is a color wheel associated with said viewfinder; and
   wherein said mechanically driven device is a headwheel, and the angular velocity of said color wheel and of said headwheel are different.

2. An improved television camerarecorder arrangement for recording television signals representative of a scene, comprising:
   optical processing means for forming an image of the scene;
   controllable image transducing means coupled to said optical processing means, said image transducing means including a photoresponsive surface for generating video signals in response to light from the scene being imaged, said transducing means being responsive to a clock signal applied to a clock signal input terminal for recurrently transferring said video signals from said image transducing means; whereby when said light from said scene is incident on said controllable image transducer means while said video signal is being transferred, said video signal is undesirably contaminated;
   a source of synchronizing signals coupled to said transducing means for causing substantially instantaneous control of said video signals;
   a shutter for blocking light to said transducing means during at least said recurrent transfer intervals;
   a controllable recorder coupled to said transducing means for receiving said video signals therefrom for recording and also coupled to said source of synchronizing signals for receiving synchronizing signals therefrom for control of the rate of mechanical motion of said recorder, said mechanical motion being subject to perturbation relative to said synchronizing signals due to the inertia of the mechanical portions of said recorder;
   synchronizing means coupled to said source of synchronizing signals, to said image transducing means and to said recorder for synchronizing the mechanical operation of said recorder with said clock signal which controls the recurrent transfer of video signals from said imager; and
   mechanical coupling means for coupling said shutter with mechanical portions of said recorder whereby said synchronizing means synchronizes the mechanical operation of both said shutter and said recorder with the recurrent transfer of video signals from said imager such that incident light is blocked during said recurrent transfer intervals, thereby preventing said contamination.

3. The apparatus according to claim 2 wherein said at least a portion of a television frame includes that period of time in which said clock signal is applied to said clock signal input terminal.

4. The apparatus according to claim 2 wherein said shutter includes two blades disposed 180° apart and the angular sector, $\alpha$, subtended by each of the two blades is proportioned to 180° in the same ratio as the pull-down time, $t_{pd}$, to the field interval, $t_f$, according to equation:

$$\alpha = t_{pd}/t_f (180°)$$

5. An arrangement according to claim 2 wherein said source of synchronizing signals includes a rotary mechanical member, said recorder is a helical-scan tape recorder including a headwheel, and said synchronizing means includes a mechanical coupling of said rotary mechanical member with said headwheel.

6. An arrangement according to claim 5 wherein said rotary mechanical member includes speed indicating means for generating a signal indicative of said headwheel speed.

7. An improved television camerarecorder arrangement for recording television signals representative of a scene, comprising:
   optical processing means for forming an image of the scene;
   image transducing means coupled to said optical processing means, said image transducing means including a photosensitive surface for generating signal in response to light from the scene being imaged, said transducing means further including means for transferring said signal from the imager during a recurrent transfer interval, whereby said light from the scene undesirably contaminates said signal during said transfer interval;
   a shutter for blocking light to said transducer during at least said recurrent transfer intervals;
   a controllable recorder coupled with said imager for receiving said signal therefrom for recording said signal at a controlled rate by means of a mechanically driven device;
   recorder drive means coupled to said recorder and to said imager for driving said device at a rate related to the recurrence rate of said transfer interval, wherein the improvement comprises;

mechanical coupling means coupled to said recorder drive means and to said shutter for mechanically driving said shutter from said recorder drive means such that said shutter blocks light from being imaged onto said photosensitive surface during said recurrent transfer intervals, thereby substantially preventing said undesirable contamination.

8. The apparatus according to claim 7 wherein said at least a portion of said television field includes said recurrent transfer interval.

9. The apparatus according to claim 7 wherein said shutter includes two blades disposed 180° apart and the angular sector, $\alpha$, subtended by each of the two blades is proportioned at 180° in the same ratio as the pull-down time, $t_{pd}$, to the field interval, $t_f$, according to the equation:

$$\alpha = t_{pd}/t_f (180°).$$

10. An arrangement in accordance with claim 7 wherein said recorder is a helical-scan recorder, and said mechanically driven device is a headwheel.

11. An arrangement in accordance with claims 7 or 10 wherein said recorder drive means comprises a rotary motor.

12. An arrangement according to claim 7 wherein said recorder comprises a headwheel and said mechanical coupling means comprises a shaft for coupling said headwheel with said shutter.

13. An arrangement according to claim 12 wherein said recorder drive means comprises a rotary motor coupled with said headwheel.

14. An arrangement according to claim 12 wherein said shaft is flexible.

15. An arrangement according to claim 14 wherein said shaft is a flexible tube.

* * * * *